Dec. 29, 1936.    G. E. BLACK    2,065,511
APPARATUS FOR PRODUCING CELLULAR METAL BUILDING UNITS
Filed Feb. 19, 1935    2 Sheets-Sheet 2
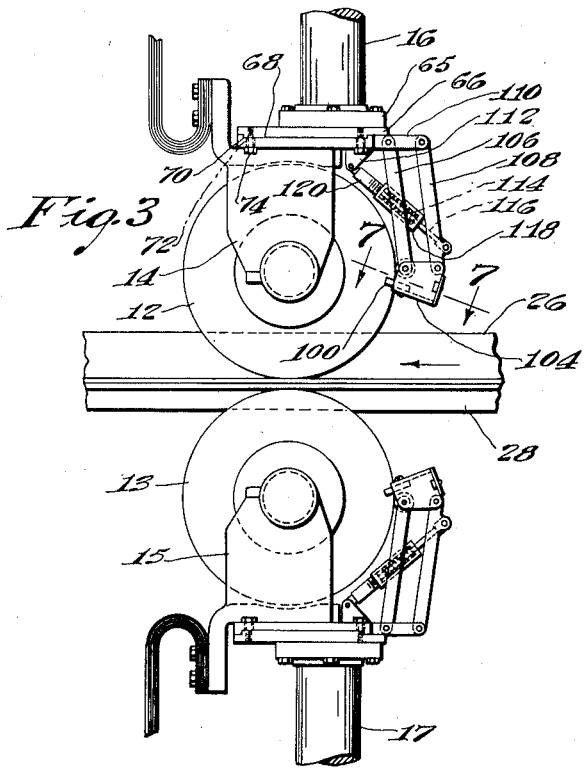
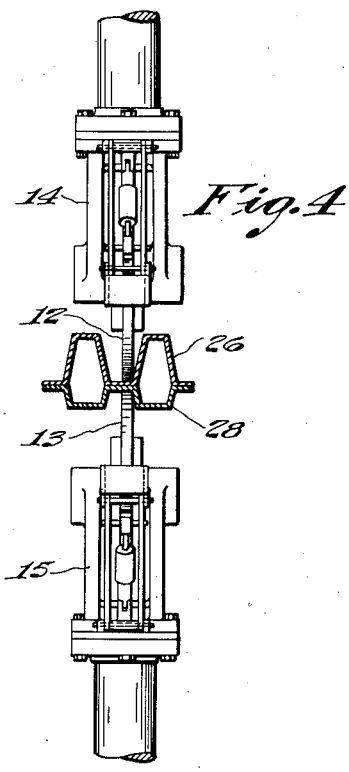
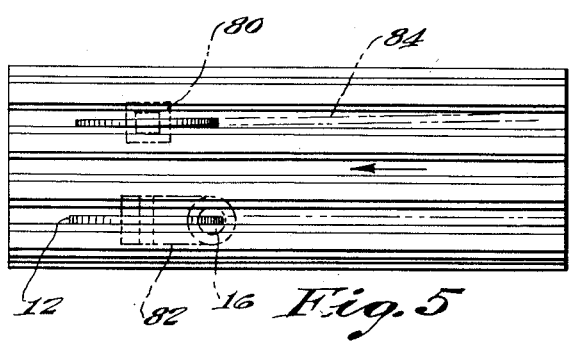
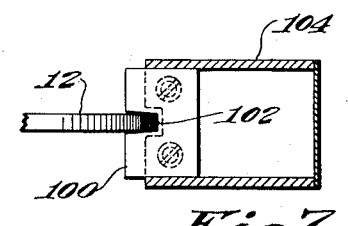
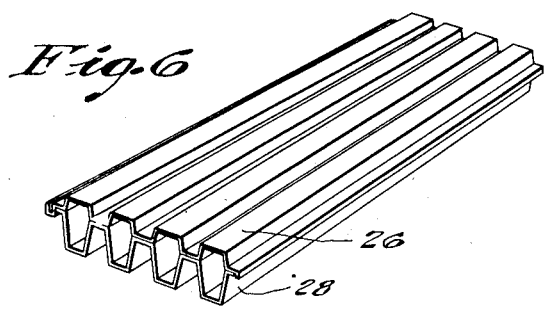
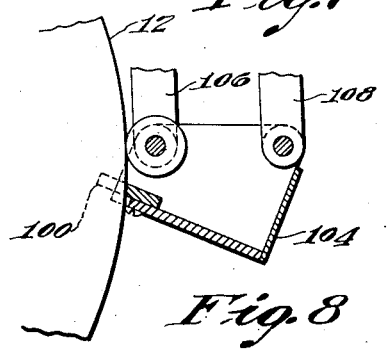
INVENTOR
George E. Black
BY
Jas. H. Churchill
ATTORNEY Patented Dec. 29, 1936

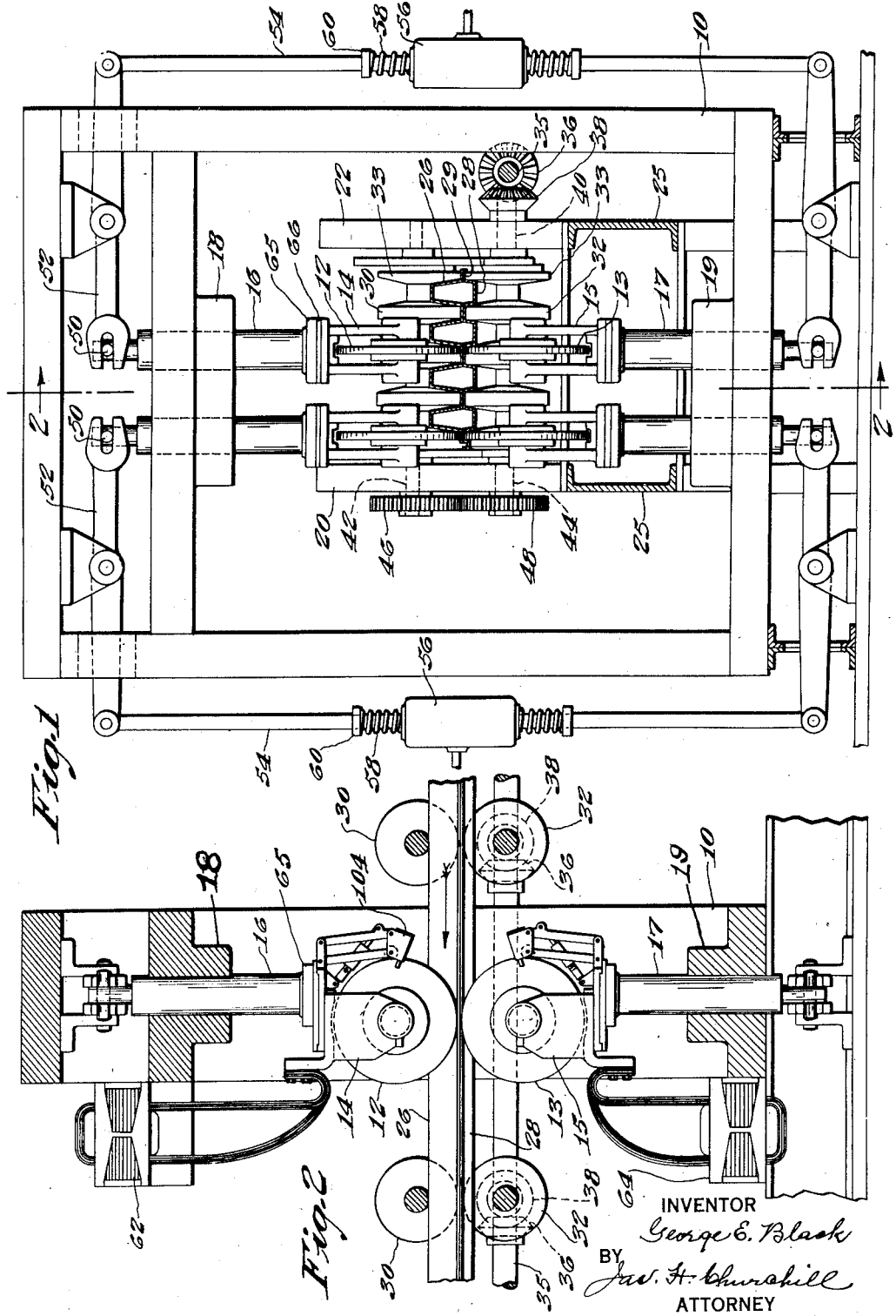

2,065,511

UNITED STATES PATENT OFFICE 2,065,511

APPARATUS FOR PRODUCING CELLULAR METAL BUILDING UNITS

George E. Black, Sewickley, Pa., assignor to H. H. Robertson Company, Pittsburgh, Pa., a corporation of Pennsylvania Application February 19, 1935, Serial No. 7,196

10 Claims. (Cl. 219—4)

This invention relates to apparatus for producing cellular metal building units.

One object of the invention is to provide novel and efficient apparatus for producing a cellular metal building unit by welding together a plurality of metal members, preferably sheet metal members, and at least one of which is corrugated.

To this end, the machine is provided with cooperating welding electrodes and preferably with a plurality of sets of such electrodes, and with mechanism for feeding component metal members to be welded in between said electrodes and for maintaining metal members in predetermined relation to one another. In accordance with the present invention, the electrodes may and preferably will be mounted to possess a caster action so that as successive pairs of component members are fed through the welding machine, the welding electrodes are automatically maintained in alignment with one another. Provision is also preferably made for trimming the burr or the flattened edge from the electrode in order to maintain the electrodes of constant cross-section, whereby uniform welds are obtained at all times and avoiding the necessity of increasing the current used in performing the welding operation. Provision is also made for preventing the trimmed portions of the electrode from being deposited upon the component members to be welded.

These and other features of the invention will be hereinafter described and particularly defined in the claims at the end of this specification.

In the drawings illustrating the preferred embodiment of the invention, Fig. 1 is a sectional view illustrating one set of welding electrodes and the mechanism for feeding and registering the component metal members; Fig. 2 is a sectional view taken on the line 2—2 of Fig. 1; Fig. 3 is an enlarged detail illustrating a cooperating pair of welding electrodes and the mechanism for trimming the burrs from the edge of the electrodes; Fig. 4 is a detail end elevation illustrating the electrodes shown in Fig. 3; Figs. 5 and 6 are views in plan and perspective respectively of a cellular metal building unit such as a flooring unit produced by the present apparatus; Fig. 7 is a sectional detail on the line 7—7 of Fig. 3; and Fig. 8 is a vertical sectional detail illustrating the receptacle for catching the chips resulting from the electrode trimming operation.

In general, the present apparatus finds particular use in a machine for producing a cellular metal building unit, preferably the cellular steel flooring unit illustrated in and forming the subject matter of United States Patent No. 1,867,433. In producing the cellular metal building unit and more particularly the cellular steel flooring unit, two component members such as two sheets of steel, at least one of which is corrugated, are assembled in superposed and contacting relation and are fed in this relationship into the machine. Provision is made for maintaining such members in their predetermined registered relation to one another and for moving the registered members as a unit through the machine. As above stated, the machine is preferably provided with a plurality of sets of welding electrodes arranged to contact with the external surfaces of the metal members under pressure, and provision is made for causing a welding current to flow from one electrode through the interposed portions of the metal members and to the other electrode to thereby perform the welding operation. In practice, in producing the steel flooring unit, forming the subject matter of the aforesaid Young Patent No. 1,867,433, a plurality of sets of electrodes are provided sufficient in number and arranged to weld component steel sheets between the corrugations thereof. In order to maintain the cooperating electrodes in alignment, provision is made for mounting the electrodes so that they possess a caster mounting, and as the assembled component members are moved through the machine the caster action of the electrodes in passing over the surfaces of the sheets automatically causes the electrodes to remain in alignment. Prior to the present invention, considerable difficulty has been experienced because of the fact that even the slightest angularity in the setting of one electrode has caused considerable difficulty in the production of even and uniform welds.

In practice, operating with a twenty inch diameter electrode, if the electrode is out of line by 1/64 of an inch, for example, this slight angularity of the setting of the electrode would cause the latter to have a tendency to follow the line of angularity so that in one revolution of the twenty inch diameter electrode, which would cover approximately five feet of length of the component metal members, the electrode would have moved 1/64 of an inch laterally away from the desired line of the welds, and therefore out of alignment with its cooperating electrode. As the steel flooring sections are preferably butted one to another to form one continuous length in being passed through the machine, it will readily be seen that if this lateral displacement of the electrode were permitted to continue over a length of one thousand feet, for example, the result would be a lateral traverse of the electrode of approximately three inches. However, in practice, because of the rigid mounting of the electrode in the machine, the electrode has been restrained from movement out of alignment, due to the manner in which the work is fed between the electrodes and due also to the fact that the electrodes have been held in fixed bearings with relation to the feeding rollers. Nevertheless, the strain of being constantly urged out of line due to any angularity, however slight, of the mounting of the electrode, caused considerable wear on the latter and a constant strain upon the welding unit as a whole and it has been found to be practically impossible to keep the upper and lower electrodes in perfect alignment, thereby causing uneven welds. By mounting the electrodes to possess a caster action the electrodes automatically align themselves with the traverse of the sheet through the machine and the difficulties heretofore experienced are avoided. By feeding the sheet in the direction of offset of the caster mounting the electrode will follow the line of least resistance, and therefore a straight line weld will result. The caster mounting eliminates all lateral strain, reduces wear and causes the welding electrodes to automatically align themselves, resulting in smoother performance and producing uniform and even welds.

The machine is also preferably provided with a trimmer for removing the burr or flattened out edge caused by the heat and pressure on the electrodes thus enabling an electrode of constant cross-section to be maintained so that uniform welds are at all times produced.

Referring now to the drawings; in the illustrated machine, which as above stated is designed particularly for use in producing a sheet steel cellular flooring unit, 10 represents the frame of the machine which is arranged to support a plurality of pairs of welding electrodes 12, 13. As herein shown, the welding electrodes may comprise wheels rotatably mounted in yokes 14, 15 which are attached to and offset from supporting rods 16, 17 slidably mounted in suitable bearings 18, 19 in a portion of the machine frame. Provision is made, as will be described, for effecting movement of the electrodes towards and from one another in order to exert pressure upon the two component steel sheets to be welded and to thereby enable the requisite weld to be obtained by the passage of the welding current through the electrodes and through the portions of the sheet pressed between the same.

The machine is provided with a plurality of sets of electrodes preferably arranged in staggered relation, so that as the assembled sheets are moved during the operation of the machine through successive sets of electrodes the sheets are welded in lines closely adjacent to each cell.

The machine is further provided with means for supporting, positioning and moving the assembled component sheet metal members through the machine, and as herein shown, is provided with a series of sets of positioning and feeding rollers as best shown in Figs. 1 and 2. Each set of rollers is journalled in suitable bearings in brackets 20, 22 supported on longitudinally extended supporting members 25 forming a part of the frame. Provision is made for driving a plurality of the sets of rollers in order to positively feed the assembled metal members 26, 28 after they have been once positioned and without disturbing their predetermined relation to one another. It is preferred to shape the feeding rollers 30, 32, so that they will snugly fit the corrugations in one or both of the component sheet metal members. The end rollers 33 are preferably shaped to snugly fit into the recess formed by the marginal lips on the side of the preferred form of building unit so as to definitely maintain the component members in predetermined relation to one another during their movement through the machine. When one of the members of the flooring unit is not corrugated one set of the rollers 30, 32, serves as feed rollers only, and the desired positioning is effected by the reception of the end rollers 33 and the marginal recesses 29 of the unit.

The plurality of sets of feed rollers 30, 32 are driven from a driving shaft 35 extending lengthwise of the machine frame and which is connected to any suitable form of driving power such as an electric motor, not shown. The driving shaft is provided with a series of bevel gears 36 which are arranged to cooperate with bevel gears 38 upon the extended ends of the shafts 40 of the lower sets of feed rolls, as illustrated in Fig. 1. Provision is made for gearing together the upper and lower sets of rolls 30, 32 comprising each pair of feed rolls, and as illustrated in Fig. 1, the extended ends 42, 44 of the shafts of the upper and lower feed rolls 30, 32 are provided with cooperating spur gears 46, 48.

In order that the requisite welding pressure may be applied by the electrodes during the welding operation and in order that equal amounts of pressure by each cooperating pair of electrodes may be applied, to the end that no bending or distortion of the work can take place while it is being welded, the electrodes are arranged in floating relationship and provision is made for effecting movement of the electrodes 12, 13 toward and from each other under equal pressures. As shown in Fig. 1, the upper portions of the supporting rods 16 of said electrodes are provided with pins 50 adapted to be received in the slotted ends of levers 52 which are pivotally mounted on the frame and connected at the opposite ends to the plunger rods 54 of the hydraulic cylinders 56. The hydraulic cylinders may be connected with any well known means for supplying pressure thereto. In order to assure that the cooperating electrodes will be actuated to quickly close the weld, springs 58 are provided between the ends of the hydraulic cylinder 56 and collars 60 fast on the rods 54 thereof.

Any usual or preferred means are employed for causing the welding current to flow through the welding electrodes and the component metal members and as herein shown the current is taken from a suitable source of power and passed through the primary coils of transformers 62, 64. In practice and as herein shown in Fig. 1, two pairs of cooperating electrodes 12, 13 are mounted to simultaneously weld along laterally spaced apart lines, and a flow of current is induced in a circuit which includes the transformer secondaries, the upper and lower welding rolls 12, 13 of one of the aforesaid pair, and then through the second pair of cooperating welding rolls. In practice, in producing the preferred metal flooring unit, a plurality of welding units such as is illustrated in Figs. 1 and 2, are arranged in staggered relation so that as the assembled sheets are moved during the operation of the machine through successive sets of electrodes the sheets are welded in lines closely adjacent to each cell. It will be observed that this spaced disposition of the plurality of pairs of electrodes with the simultaneous welding of the component metal members together at a plurality of points spaced laterally and longitudinally of the unit insures rapid production and at the same time guards against overheating of the metal of the flooring unit.

While it is preferred to embody the different features of the invention in a machine illustrated, and the general construction of which has been described, a more detailed description of the specific mounting of the electrodes will, it is thought, clearly illustrate one feature of the invention. As illustrated in Figs. 3 and 4, the cooperating electrodes 12 and 13 are mounted in yokes 14, 15 which are attached to flanges 65 on the ends of the supporting rods 16, 17 by a connecting piece 66. The connecting piece is provided with a tongue 68 which fits into a groove 70 in the yoke 14 or 15 and provision is made for permitting adjustment of the yoke transversely with relation to the connecting piece 66 in order to properly align the electrode with the supporting rod 16. To this end, the yoke is provided with lateral slots 72 which will permit the yoke to be moved to the correct alignment after which the bolts 74 are tightened down. In order to permit a caster action of the electrodes, the rods 16, 17 are rotatably mounted in the bearings 18, 19, so that the rods 16, 17 serve as pivots or pintles for the offset casters in which the electrodes 12, 13 are mounted to be rotated by the sheets fed between them in a plane substantially at right angles to that in which the pintles 16, 17 are roated, and with the centers or axes of the rotatable electrodes offset with relation to the axes of the pintles or supporting members 16, 17.

Referring now to Fig. 5, wherein a rigid mounting 80 and a caster action mounting 82 are diagrammatically illustrated for comparison, it will be observed that in the rigid mounting 80, if the electrode was inadvertently set at a slight angle as shown, the resulting weld would tend to follow an angular line 84. This tendency would result in an undue strain and excessive wear upon the electrode and the rigid mounting, and it has been found that it was extremely difficult to keep the upper and lower electrodes in perfect alignment. However, with the electrode mounted to possess a caster action as illustrated diagrammatically at 82, the electrode after once being set in alignment with the pivoting point 16, in relation to the direction of travel of the work as indicated by the arrow in Fig. 5, will tend to follow a straight line, along the edge of the cell where the weld is desired, and thereby cause the upper and lower electrodes to automatically align themselves, and to be maintained in alignment, thereby eliminating any strain and resultant wear, resulting in the production of a more uniform and efficient weld.

In commercial operation the electrodes have a tendency to flatten out by reason of the heating effects and the pressure used for welding. To effect the removal of the burr or flattened out edge caused by the heat and pressure on the electrodes, a trimmer is provided, thus enabling an electrode of constant cross section to be maintained so that uniform welds are at all times produced. As shown in Figs. 3, 7, and 8, the trimmer comprises a knife 100 provided with a recessed portion 102 through which the electrode passes. The knife 100 is supported by and forms an extension of the bottom portion of a chip catcher 104 which comprises a three sided box open at the top, and which is arranged to collect and hold the trimmed portions of the electrodes to thereby prevent the chips from falling down on the work to be welded. The chip catcher 104 is supported by links 106, 108 which are pivotally attached to the sides of the chip catcher and connected to an extension 110 of the yoke 14. The trimming knife 100 is yieldably urged against the periphery of the electrode and as herein shown, an adjustable spring unit is connected at one end to the link 108 and at the other end to a lug 112 depending from the yoke 14. The spring 114 is coiled around a rod 116 which is slidably mounted in a threaded casing 118. The other end of the link 120 fits into the casing so that by turning the casing the tension of the spring 114 may be adjusted. It will be observed that the electrodes are made as a flat plate so that the trimming knife has only to remove the burrs on the edge of the electrode to maintain a constant cross section.

While the different features of the invention have been illustrated and described in connection with a machine for automatically welding together the component metal members to produce a building unit, it is to be understood that they may be embodied with advantage in other forms of welding machines.

Having thus described the invention, what is claimed is:

1. In a machine of the character described, in combination, work supporting and feeding means, cooperating rotatable welding electrodes adapted to engage the opposite surfaces of the work as the latter is fed between the same, and means for supporting said electrodes each of said supporting means having a pintle rotatable in one plane and having a portion offset with relation to said pintle and in which the electrode is mounted to rotate in a plane substantially at right angles to the plane in which the pintle is rotated.

2. In a machine of the character described, in combination, work supporting and feeding means, cooperating rotatable welding electrodes adapted to engage the opposite surfaces of the work as the latter is fed between the same, and means for supporting one of said electrodes said supporting means having a pintle rotatable in one plane and having a portion offset with relation to said pintle and in which the electrode is mounted to rotate in a plane substantially at right angles to the plane in which the pintle is rotated.

3. In a machine of the character described, the combination with work supporting means of a cooperating rotatable welding electrode, means for relatively moving the welding electrode and work to perform the welding operation, and means for supporting the welding electrode, said means having a pintle arranged substantially at right angles to the path in which the work is fed and having the rotatable electrode mounted thereon with its axis offset with relation to said pintle.

4. In a machine of the character described, in combination, work supporting means, a welding electrode, means for relatively moving the welding electrode and work to perform the welding operation, means for supporting the welding electrode in such manner as to impart thereto a caster action including a supporting member, means for rotatably supporting the supporting member, an electrode supporting bracket secured to and offset with relation to said supporting member, and an electrode rotatably mounted in said offset bracket.

5. In a machine of the character described, in combination, work supporting means, a welding electrode, means for relatively moving the welding electrode and work to perform the welding operation, means for supporting the welding electrode in such manner as to impart thereto a caster action including a supporting member, means in which said supporting member is rotatably journalled, an electrode supporting bracket, an electrode rotatably mounted therein and offset with relation to said rotatable supporting member, and means for adjustably connecting the electrode supporting bracket and said rotatable supporting member.

6. In a machine of the character described, in combination, a rotatable electrode and a caster-like support in which said electrode is mounted with the axis of the rotatable electrode offset with relation to the pintle of said support.

7. In a machine of the character described, in combination, a rotatable electrode, a caster-like support for said rotatable electrode having a rotatable pintle offset with relation to the axis of said rotatable electrode, and means connected with said pintle to effect movement of said pintle lengthwise while permitting rotary movement thereof.

8. In a machine of the character described, in combination, a caster-like frame having a pintle, a bracket secured to said pintle and laterally adjustable with relation thereto, means to secure said bracket in its adjusted position, and a rotatable electrode mounted on said bracket to rotate substantially at right angles to said pintle and with the axis of the rotatable electrode offset with relation to said pintle.

9. In a machine of the character described, in combination, a caster-like frame having a pintle provided with a head, a bracket secured to said head and laterally adjustable thereon, means for securing said bracket to said head in its adjusted position, and a rotatable electrode mounted in said bracket and having its axis offset with relation to the said pintle and substantially at right angles thereto.

10. In a machine of the character described, in combination, work supporting and feeding means, co-operating rotatable welding electrodes arranged on opposite sides of the path of movement of the work with their axes substantially parallel with said path in a plane substantially at right angles to said path, caster-like frames on opposite sides of said path and in which said axes are mounted and which are provided with rotatable pintles offset with relation to said axes and arranged substantially at right angles to the path of movement of said work.

GEORGE E. BLACK.